UNITED STATES PATENT OFFICE.

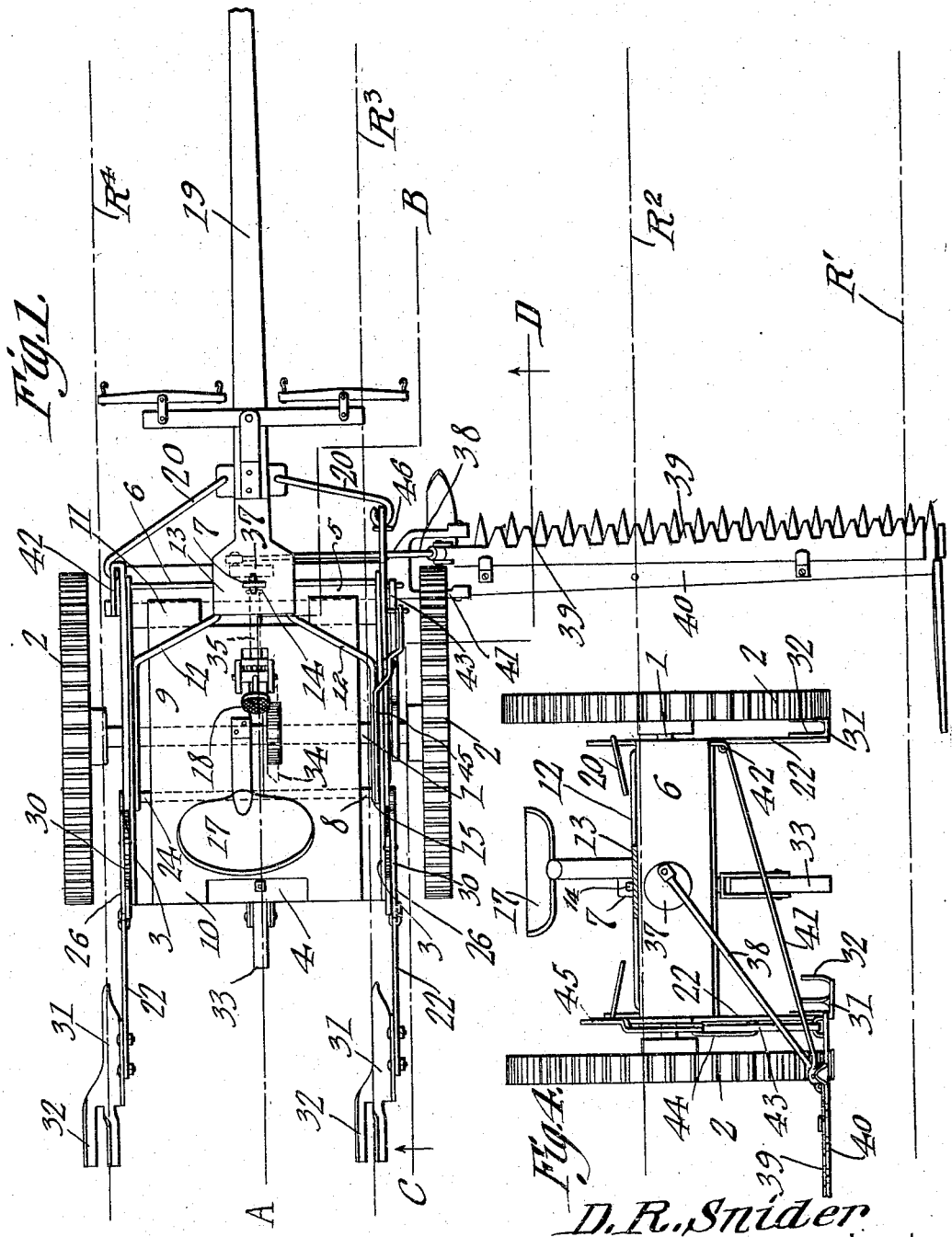

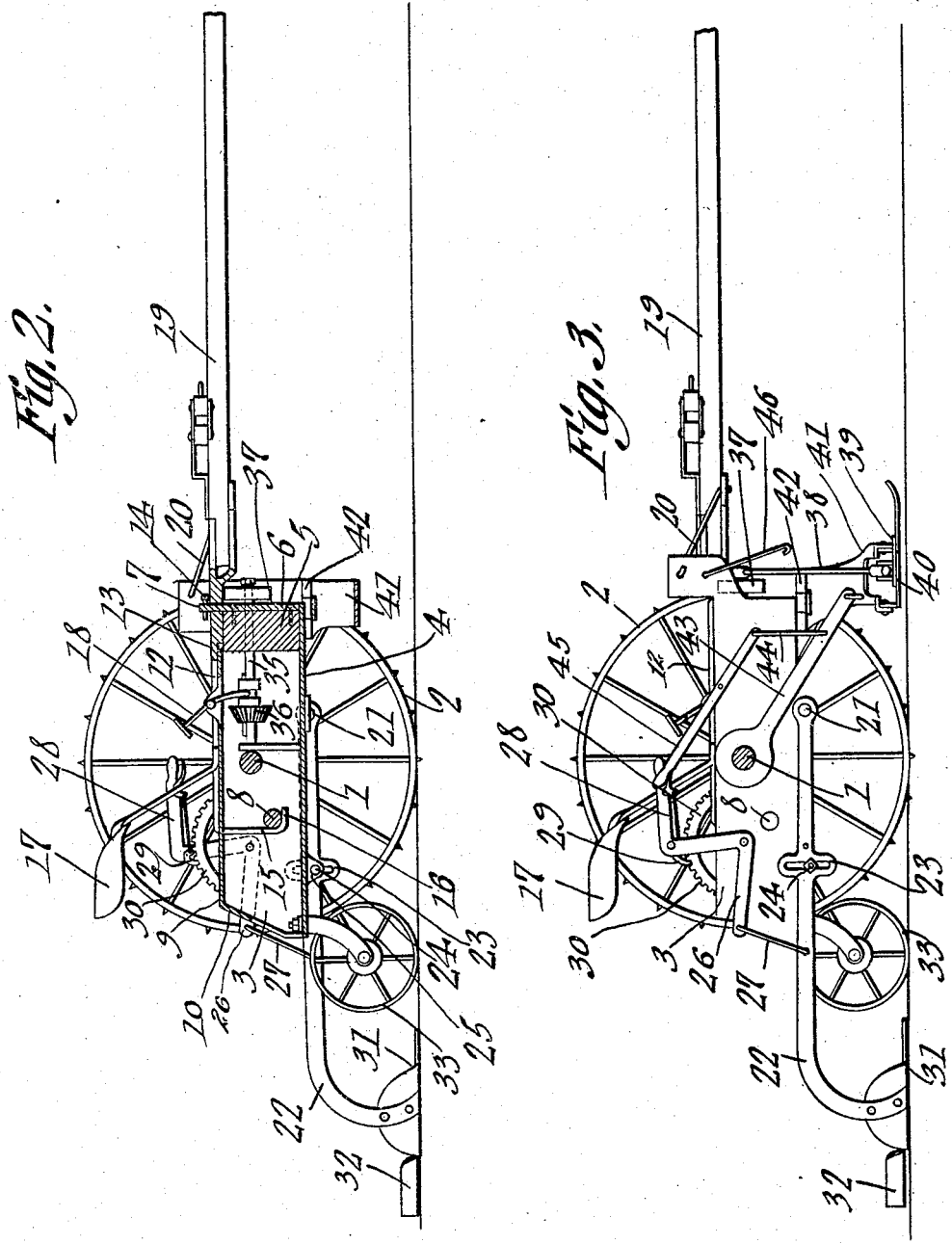

DAVID R. SNIDER, OF GLENWOOD SPRINGS, COLORADO, ASSIGNOR OF ONE-HALF TO WILLIAM W. FRANK, OF GLENWOOD SPRINGS, COLORADO.

MACHINE FOR HARVESTING BEETS.

1,187,016.  Specification of Letters Patent.  Patented June 13, 1916.

Application filed December 1, 1915. Serial No. 64,475.

*To all whom it may concern:*

Be it known that I, DAVID R. SNIDER, a citizen of the United States, residing at Glenwood Springs, in the county of Garfield and State of Colorado, have invented a new and useful Machine for Harvesting Beets, of which the following is a specification.

This invention relates to machines for harvesting beets, one of the objects of the invention being to provide a machine of this character having means whereby the tops of the beets are removed along two rows while diggers are operating upon the two rows previously topped, said diggers serving not only to lift the beets but to separate them from the loosened soil so that they can be gathered readily.

A further object is to provide a machine of this character which is constantly under the control of the driver and which can be converted readily from a beet harvester into a mower or a plow, thus greatly increasing the utility of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the machine. Fig. 2 is a section on line A—B Fig. 1. Fig. 3 is a section on line C—D Fig. 1. Fig. 4 is a front elevation of a portion of the machine, certain parts being removed and other parts shown in section, said view showing the connections between the harvesting mechanism and the machine.

Referring to the figures by characters of reference 1 designates the axle of the machine carried by supporting wheels 2 which may be connected thereto by the usual pawl and ratchet mechanism, not shown, and by means of which one wheel may rotate slower than the other, as when turning.

Mounted on the axle 1 are side members 3 along the lower edges of which is provided a platform 4, there being a front beam 5 extending transversely between the front portions of the side members 3 and secured thereto and to the platform in any manner desired. A securing plate 6 is secured to the front of the beam 5 and has an upstanding ear 7. A transverse rod 8 connects the side members 3 and disposed between the upper edge portions of the side members is a removable platform 9 having depending legs 10 at its rear end while its front end is provided with forwardly extending arms 11 designed to rest upon the beam 5. Resting on this suppplemental platform 9 is a yoke 12 extending from a head 13 which rests upon the beam 5 and has an opening through which the ear 7 extends. A fastening pin 14 extends through the ear above the head 13 and serves to prevent removal of the head from the ear. The rear ends of the arms of yoke 12 have depending fingers 15 provided with hooked terminals 16 which engage the rod 8. Thus it will be seen that after the terminals 16 have been hooked into engagement with rod 8, and the head 13 swung downwardly onto the supplemental platform 9 and pin 14 inserted above the head and into the ear 7, the parts will be securely held together. The supplemental platform 9 carries a seat 17 for the driver and also carries a foot lever 18. A draft tongue 19 is connected to the head 13 and extends forwardly therefrom. This draft tongue or beam may be suitably braced, as by means of rearwardly diverging rods 20 connected to the front end portions of the side members 3.

A pivot member 21 is extended transversely under the platform 4 in advance of the axle 1 and the end portions of this pivot member are engaged by plow beams 22. Intermediate portions of these beams are enlarged to form loops 23 slidably mounted on the end portions of a guide rod 24 supported under platform 4 by ears 25. Bell crank levers 26 are pivotally connected to the side members 3 and one arm of each bell crank lever is connected by a link 27 to the adjacent beam 22, while the other arm of each lever has a handle portion 28 extending therefrom to a point where it can be conveniently grasped by the occupant of the seat 17. This handle 28 carries a pawl 29 adapted to engage a toothed segment 30 whereby lever 26 can be locked in any position to which it may be adjusted and the beam 22 thus held in raised or lowered position. Each beam 22 carries a plow 31 of any preferred construction for digging the beets, said plow having rearwardly extending fingers 32 forming a grate adapted to have beets directed thereon, thus to separate the dirt therefrom. A caster wheel 33 is connected to the rear portion of the platform 4 at the center thereof. A gear 34 is secured to and rotates with the axle 1 and extending rearwardly from the front beam 5 and in front of the axle 1 is a longitudinal shaft 35 on which is feathered a gear 36 adapted to be shifted longitudinally along shaft 35 by the foot lever 18. When gear 36 is in its forward position it is out of mesh with gear 34 but when in its rearward position it is in mesh with said gear.

Secured to the front end portion of shaft 35 is a disk 37 adapted to actuate a pitman 38 detachably connected to a cutter bar 39 slidably mounted on a finger bar 40. This finger bar is hingedly connected to a forked arm 41 extending downwardly and laterally from the front portion of the machine. This finger bar and the cutter bar are of such length as to preferably extend across two rows so as to remove the tops of the beets prior to the digging operation. Arm 41 is hingedly connected to the machine at that side thereof remote from the cutter bar and as shown at 42. That portion of the arm 41 extending under the other side of the machine and which is nearest the cutter bar 39 is pivotally connected to a lifting arm 43 pivotally mounted on the axle 1. This lifting arm is connected by a link 44 to a lever 45 which extends to a point where it can be conveniently operated by the occupant of the seat 17. A hooked holding rod 46 is employed for engaging the finger bar 40 and holding it out of active position.

It will be understood that when the finger bar is lowered and the machine is moved forward with the gear 36 in mesh with gear 34, the tops will be removed from two rows of beets, the rows being indicated at $R^1$ and $R^2$ in Fig. 2, while the diggers or plows 31 will loosen the previously topped beets in rows $R^3$ and $R^4$. The harvesting mechanism will likewise operate to remove any leaves or other growths such as sage brush. By detaching the rod 24 and unfastening beams 22 from the pivot member 21 the plow beams can be readily disconnected and the machine used solely as a harvester. By removing the pivotal connections between the pitman 38 and the cutter bar and between the pivotal arm 41 and the finger bar, the harvesting mechanism can be removed and the machine used solely for plowing purposes.

Access may be had readily to the interior mechanism of the machine by detaching the head 13, thus to uncouple the draft beam 19, whereupon the hooked fingers 15 may be uncoupled from rod 8 and the supplemental platform 9 can be removed together with all parts carried thereby.

By having a machine such as herein described, considerable expense in cultivating the soil and harvesting the crops can be effected inasmuch as the same machine can be used not only for harvesting the beets but for turning the soil and preparing it for another crop.

What is claimed is:—

In a machine of the class described, a wheel supported platform having a transverse front beam, a supplemental platform resting at its front end upon the beam and supported at its rear end by the platform, a draft beam, a yoke extending therefrom and resting on the supplemental platform, depending hooked fingers extending from the yoke, means connected to the first named platform for engagement by the fingers, and means for detachably engaging the yoke to bind it upon the front portion of the platform to hold the supplemental platform against displacement and to secure the draft beam to the platforms.

In testimony that I claim the foregoing as my own, I have hereto affixed my signature in the presence of two witnesses.

DAVID R. SNIDER.

Witnesses:
FRANK E. DICKENS,
JOHN J. RODDY.